United States Patent [19]

Novak et al.

[11] Patent Number: 5,404,129
[45] Date of Patent: Apr. 4, 1995

[54] ANTI-THEFT BATTERY SYSTEM FOR VEHICLES

[75] Inventors: David J. Novak, Elm Grove; Thomas J. Dougherty, Waukesha, both of Wis.

[73] Assignee: Globe-Union Inc., Milwaukee, Wis.

[21] Appl. No.: 97,795

[22] Filed: Jul. 27, 1993

[51] Int. Cl.⁶ .............................................. B60R 25/04
[52] U.S. Cl. ..................................... 340/428; 307/10.3
[58] Field of Search ................. 340/425.5, 426, 428; 307/10.2, 10.3, 10.7, 10.6

[56] References Cited

U.S. PATENT DOCUMENTS

| | | | |
|---|---|---|---|
| 4,958,084 | 9/1990 | Carlo et al. | 307/10.2 |
| 5,132,551 | 6/1992 | Carlo et al. | 307/10.3 |
| 5,184,023 | 2/1993 | Carlo et al. | 307/10.3 |
| 5,287,006 | 2/1994 | Carlo et al. | 307/10.3 |

OTHER PUBLICATIONS

Micrel semiconductor data sheet for the type MIC 5013, protected 8-pin Power Mosfet predriver, pp. 2–108 to 2–121.

Primary Examiner—James J. Groody
Assistant Examiner—Nathan J. Flynn
Attorney, Agent, or Firm—Leonard J. Kalinowski; E. L. Levine; Joseph E. Root, III

[57] ABSTRACT

An anti-theft battery system for vehicles includes a control circuit which is connected in the starting circuit and responds to a starting current which exceeds a set point value to interrupt the starting circuit, thereby disconnecting the starter motor from the battery preventing starting of the vehicle, a reset circuit responsive to the control circuit which resets the control circuit after a delay interval to permit the starter motor to be connected to the vehicle battery, and an override circuit for generating an override signal for overriding the control circuit for a preselected interval of time to permit an authorized operator to start the vehicle, the override circuit including a small portable transmitter adapted to be carried by the vehicle operator and a receiver connected to the control circuit.

15 Claims, 1 Drawing Sheet

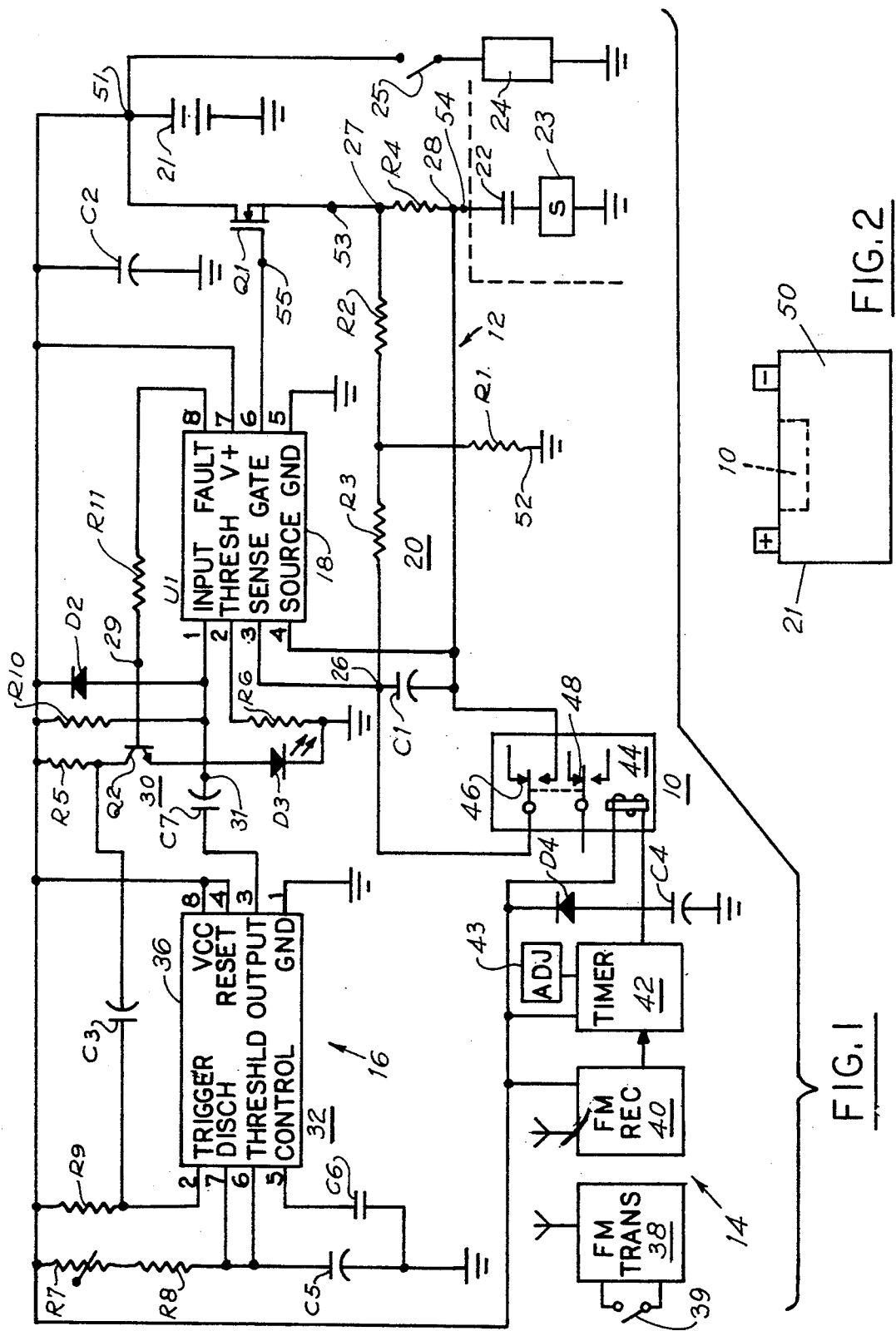

5,404,129

ANTI-THEFT BATTERY SYSTEM FOR VEHICLES

BACKGROUND OF THE INVENTION

This invention relates to vehicle anti-theft arrangements, and more particularly, to an anti-theft battery system for a vehicle which prevents starting of the vehicle by unauthorized persons.

Various methods have been devised to prevent theft of vehicles. Vehicle anti-theft methods can be divided into two broad categories, namely those methods which cause an audible or visual alarm to be generated when an unauthorized person attempts to enter or tamper with a protected vehicle and mechanisms which cause the vehicle to be disabled in one way or another. Although audible and visual alarms may deter the theft of a vehicle, they do not prevent theft of the vehicle. Known methods which have been proposed for temporarily disabling a vehicle either are complicated arrangements which are adapted to be incorporated into the vehicle operating system or arrangements which require modification of operating systems of the vehicle. For example, anti-theft systems have been proposed which are incorporated into the vehicle braking system, the fuel line system or into the vehicle ignition and starting circuit. Although such systems are difficult to compromise, they are expensive to install. Anti-theft devices such as steering column locking bars present a challenge rather than a deterrent to an automobile thief. An effective system has yet to be devised which not only will prevent vehicle theft, but also is relatively inexpensive, simple to install and easy to use. This is evidenced by the continuing rise in the number of automobile thefts from year to year.

Thus, there is a need for an effective anti-theft system for vehicles which not only will prevent vehicle theft, but also is relatively inexpensive, is simple to install and is easy to use.

SUMMARY OF THE INVENTION

The present invention provides an anti-theft battery system for vehicles. The system includes a control means which is coupled to the starting circuit of the vehicle and which responds to current flowing in the starting circuit to interrupt the starting circuit, preventing starting of the vehicle whenever current flowing through the starting circuit exceeds a set point value. The system further includes an override means which is manually operable by an authorized operator of the vehicle to override the control means, preventing the starting circuit from being interrupted by the control means to permit the vehicle engine to be started by an authorized operator. The override means includes a transmitter for generating an override signal and a receiver connected to the control means and responsive to the override signal to prevent the control means from responding to an overcurrent condition in the starting circuit. The transmitter is a small portable unit which is adapted to be carried by an authorized operator of the vehicle or attached to a key chain, for example. In accordance with one embodiment of the invention, the anti-theft battery system is enclosed within the housing of the battery which, in turn, is locked within the engine compartment of the vehicle. Thus, the anti-theft system is inaccessible because it is hidden within the battery. Moreover, the fact that the vehicle is equipped with the anti-theft system provided by the present invention is virtually impossible to detect without first attempting to start the vehicle, and this will result in temporary disabling of the vehicle starting circuit. Thus, the vehicle anti-theft battery system provided by the present invention is substantially immune to compromise.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 1 is a schematic circuit and partial block diagram of the circuit for the anti-theft battery system for vehicles provided by the present invention; and FIG. 2 is a simplified representation of a vehicle battery provided by the present invention which incorporates the anti-theft battery system for vehicles of FIG. 1.

DESCRIPTION OF A PREFERRED EMBODIMENT

Referring to FIG. 1 of the drawings, the vehicle anti-theft battery system 10 provided by the present invention includes a control circuit 12, an override circuit 14 and a reset circuit 16. The control circuit 12 includes a solid state high current sensing circuit 18 having an associated current monitoring network 20 and a switching device Q1, embodied as a field effect transistor, which is controlled by the sensing circuit 18. The control circuit 12 senses current flowing through the starting circuit and causes the starter motor to be disconnected from the battery unless the control circuit is first neutralized or overridden by an authorized operator of the vehicle.

The field effect transistor Q1 has its gate connected to the control output of the sensing circuit 18, and its source-to-drain circuit connected in the starting circuit between the positive and negative terminal of the battery 21 and in series with starting circuit resistor R4, normally open contacts 22 of the starter relay or solenoid 24, and the starter motor 23. The starter solenoid 24 is connected in series with contacts 25 of the ignition key switch between the positive terminal of the battery 21 and ground. The starter motor 23 of the vehicle is connected to the battery to draw starting current from the battery when field effect transistor Q1 is conducting and the starter relay contacts 22 are closed.

The current monitoring network 20 includes resistors R1, R2 and R3 and a capacitor C1. Resistors R2 and R3 and capacitor C1 are connected in a series circuit which, in turn, is connected in parallel with resistor R4. Resistor R1 is connected between the junction of resistors R2 and R3 and ground. Resistor R3 and capacitor C1 filter out engine noise. Resistors R1 and R2 are selected in correspondence with the value of resistor R4 to tune the current sensing circuit 18. In one realization for the current sensing circuit which had a resistor R4 of 1 megohm, the values of resistors R1 and R2 were 100 ohms and 12K ohms, respectively, and resistor R3 was 56K ohms.

The current sensing circuit 18 is embodied as a type MIC 5013 solid state high current sensing circuit, commercially available from MICREL Company. The sensing circuit 18 has its SENSE and SOURCE inputs, which serve as the input of the control circuit 12, connected to the current monitoring network 20, effectively across the starting circuit resistor R4. Specifically, the SENSE input of the sensing circuit 18 is connected to the junction of capacitor C1 and resistor R3 at junction point 26 which junction point is connected through resistor R3 and resistor R2 to one side 27 of resistor R4. The SOURCE input of the sensing circuit 18 is connected to the other side 28 of resistor R4. The GATE output of the sensing circuit 18, which is the control output of the control circuit 12, is connected to the gate of the switching device Q1. The FAULT output of the sensing circuit 18 is connected through a resistor R11 to the base of a transistor Q2 at the input 29 of the reset circuit 16. The sensing circuit 18 has an INPUT which is connected to an output 31 of the reset circuit 16 and through parallel connected resistor R10 and diode D2 to the positive battery terminal. The sensing circuit INPUT serves as the reset input for the sensing circuit 18. A resistor R6, which is connected between the THRESHOLD input of the sensing circuit 18 and ground, sets the sensing threshold level for the sensing circuit. Digressing, in the exemplary embodiment, the resistor R4 has a value of 1 megohms. The starting current drawn by the starter motor is on the order of 100 amps, producing a voltage drop of approximately 100 millivolts across resistor R4. The threshold level for the sensing circuit 18 is set substantially lower than the level of starting current required to start the engine of the vehicle. Thus, in the exemplary embodiment, the threshold for the sensing circuit 18 is set to cause its gate output to become a logic low level whenever the current flowing in the starting circuit exceeds 25 amps. The sensing circuit 18 has a POWER input connected to the positive terminal of the battery 21 and a GROUND input connected the negative terminal of the battery which is the ground reference for the anti-theft battery system 10.

The reset circuit 16 includes a switching stage 30 and a timing circuit 32. The switching stage 30 includes a transistor Q2 having its base connected to the FAULT output of the sensing circuit 18. The collector of transistor Q2 is connected through resistor R5 to the positive terminal of the battery 21. The emitter of transistor Q2 is connected to ground through a light emitting diode D3.

The timing circuit 32, which produces a signal for resetting the sensing circuit 12, is embodied as a commercially available Type 555 timer circuit 36. The timer circuit 36 has its TRIGGER input connected through a resistor R9 to the positive terminal of the battery and coupled through a capacitor C3 to the output of the switching stage at the collector of the transistor Q2. The OUTPUT of the timer circuit 36 is connected through a capacitor C7 to the reset input of the sensing circuit 18. The DISCHARGE and THRESHOLD inputs of the timer circuit 36 are commonly connected to the junction or resistor R8 and capacitor C5. The CONTROL input of the timer circuit 36 is connected to ground through a capacitor C6.

The duration of the signal generated by the timing circuit 32 is determined by a voltage divider formed by variable resistor R7, resistor R8 and capacitor C5 which are connected in series between the positive terminal of the battery 21 and ground. In the exemplary embodiment, the signal produced by the timing circuit 32 has a duration of one minute. A reset pulse for resetting the sensing circuit 18 is produced by the trailing edge of the one minute signal generated by the timing circuit 32.

The override circuit 14 includes an fm transmitter 38, an fm receiver 40, a timer circuit 42 and a switching device 44, which is embodied a relay having normally open contacts 46 and 48. The fm transmitter 38 is preferably a portable unit which is adapted to be carried by the authorized user of the vehicle in the manner of remote transmitters currently in use of activating and deactivating vehicle alarm systems. The transmitter 38 includes a manually operable enabling switch 39, operated by depressing a pushbutton extending through the housing of the portable unit, to enable the transmitter 38 to generate an override signal for the receiver. The receiver 40 responds to the override signal generated by the companion fm transmitter 38 to activate the timer circuit 42 which responsively generates a signal for operating the relay 44. The timer circuit 42 includes an adjusting network 43 for setting the duration of the signal which is generated by the timer circuit 42. In the exemplary embodiment, the timer circuit 42 is adjusted to provide a signal having a duration of one minute so that the relay 44 is maintained operated for one minute. The output of the timer circuit 42 is connected to the operate winding of the relay 44. The normally open contacts 46 of the relay 44 are connected to provide a short circuit between the SENSE and SOURCE inputs of the sensing circuit 18 and across capacitor C1 when the contacts 46 are closed.

Referring additionally to FIG. 2, the electronic circuit of the anti-theft battery system 10 may be contained within the housing 50 of the battery 21. The circuit has terminals 51–55 (FIG. 1) which are mounted in a suitable electrical connector (not shown) to facilitate connection of the anti-theft battery system 10 to the terminals of the battery and to appropriate terminals of the starting circuit of the vehicle in which the anti-theft battery system 10 is used, thereby simplifying the installation and maintenance of the anti-theft battery system 10.

For purposes of illustration of the operation of the vehicle anti-theft battery system 10, it is assumed that an authorized operator is about to start the engine of the vehicle. Before trying to start the engine of the vehicle, the authorized operator operates the switch 39 on the remote unit, causing the transmitter to generate an override signal. The receiver responds to the override signal and enables the timer circuit 42 which generates a timing signal which is one minute in duration in the exemplary example. The timing signal operates relay 44 which closes contacts 46, providing a short circuit between the SENSE input and the SOURCE input of the current sensing circuit 18, and across the capacitor C1 connected therebetween, discharging the capacitor. Accordingly, the differential potential between the SENSE input and the SOURCE input of the current sensing circuit 18 is reduced to zero, so that the current sensing circuit 18 is prevented from responding to current flow through the starting circuit for the duration of the timing signal which maintains the relay 44 operated.

Then, the operator operates the ignition key through the "on" position towards the start position. When the ignition key is operated to the start position, the starter relay 24 is operated to close the contacts 25 to connect the starter motor 23 to the vehicle battery 21, enabling the vehicle to be started in the normal manner because the current sensing circuit 18 cannot detect starting current.

If for any reason the authorized operator does not disable the control circuit 12 before attempting to start the vehicle engine, or if an unauthorized person is attempting to start the vehicle, then when ignition switch is closed (or if the ignition switch is jumped), the starter relay 24 is operated to close the starter contacts 22 to connect the starter motor 23 to the vehicle battery. When the starter motor 23 is energized, a surge of current flows through the starting circuit. This current surge is detected by the current sensing circuit which turns off the field effect transistor Q1, thereby interrupting the starting circuit.

When the starter relay 24 is operated to energize the starter motor, the starting current drawn by the starter motor 23 increases to be about 100 amps, producing a voltage drop of approximately 100 millivolts across resistor R4. A portion of this current flows to ground through resistors R2 and R3 and capacitor C1, charging capacitor C1. As capacitor C1 charges, the potential difference between the SENSE input and the SOURCE input of the sensing circuit 18 increases. When the potential difference between the SENSE input and the SOURCE input exceeds the threshold value set by resistor R6, the GATE output of the control circuit becomes a logic low, turning off the field effect transistor. When the field effect transistor is turned off, the starting circuit is interrupted, so that the starter motor 23 is disconnected from the battery 21 and the vehicle can not be started.

In addition, the FAULT output of the sensing circuit becomes a logic high level, enabling transistor Q2 to conduct. When transistor Q2 conducts, current flow through the collector-emitter circuit of the transistor Q2 causes a pulse to be generated through capacitor C3 to trigger on the timer circuit 36 which produces a timing signal that is one minute in duration. In addition, the light emitting diode D3 is energized providing a visual indication to the operator that the starter motor 23 circuit has been disconnected from the battery.

When the one minute timing signal terminates, the output of the timer circuit 36 transitions from a logic high to a logic low, generating a pulse through capacitor C7 for resetting the current sensing circuit 18. Accordingly, the current sensing circuit 18 enables the field effect transistor Q1 to reconnect the starter motor 23 to the battery 21. Thus, if through inadvertence an authorized operator fails to disable the control circuit 12 before attempting to start the vehicle, initially, the starting circuit will become locked out, but the control circuit 12 automatically resets itself after the timing interval established by the timing circuit 32.

Thus, it can be seen that the present invention provides an anti-theft battery system for vehicles which prevents starting of the vehicle engine if the system is not overridden prior to attempting to start the engine. The anti-theft battery system includes a control circuit which responds to a high level current, such as starting current, to disconnect the starter motor from the battery, preventing starting of the engine. The control circuit can be temporarily disabled or overridden in response to an override signal generated by a transmitter operated by an authorized person prior to attempting to start the vehicle. The transmitter is a small portable unit which is carried by the authorized operator of the vehicle. In accordance with a preferred embodiment, the electronic circuitry of the anti-theft battery system is mounted within the vehicle battery. Thus, the vehicle anti-theft battery system is unaccessible because it is hidden within the battery which is locked within the engine compartment of the vehicle. Moreover, the fact that the vehicle is equipped with an anti-theft battery system is virtually impossible to detect without attempting to start the vehicle which will result in temporary disabling of the vehicle starting circuit. Thus, the vehicle anti-theft battery system provided by the present invention is not subject to compromise.

Although the anti-theft battery system for vehicles has been described with reference to a preferred embodiment, it is apparent that variations in the details of the embodiment described may be made without departing from the spirit and scope of the invention as defined by the appended claims. For example, the transmitter and receiver may be replaced by a hardwired key-operated switch which is located inside or outside of the vehicle. The reset signal may be generated by the relay 44 of the override circuit 14 by connecting normally open contacts 48 between ground and the reset input of the current sensing circuit 18. Moreover, the field effect transistor may be controlled to limit current flow through the starting circuit to a level insufficient to start the vehicle rather than interrupting the starting circuit. In addition, although the switching device Q1 that controls the completion and interruption of the starting circuit is embodied as a field effect transistor in the preferred embodiment, the device may be any type of electrical switching or energy transfer of control device, such as a relay or other type of electromechanical device, or magnetic switch, or any type of electronic switching device, such as a thyristor, a silicon controlled rectifier, a power switching transistor, a photo-optical switch, or any other type of solid state switching device. Also, although the system is mounted within the battery housing, the circuit may be mounted in proximity of the starter motor or starting circuit or may be mounted adjacent to but exterior of the battery.

We claim:

1. An anti-theft battery system for a vehicle having a battery and a starting circuit including a starter motor which is adapted to be connected to the battery of the vehicle to be energized by current from the battery for starting an engine of the vehicle, said system comprising:

switching means connected in the starting circuit and operable between a first condition in which said switching means permits current sufficient to operate the starter motor to flow in the starter circuit and a second condition in which said switching means limits current in the starter circuit to a value that is insufficient to operate the starter motor;

control means including a current monitoring circuit operable between set and reset states, said control means being coupled to said switching means for operating said switching means to said first condition when said current monitoring circuit is operated from said set state to said reset state, and for operating said switching means to said second condition when said current monitoring circuit is operated from said reset state to said set state, said current monitoring circuit being coupled to the starting circuit for monitoring current flowing in the starting circuit and being operated from said reset state to said set state when current flowing in the starting circuit exceeds a set point value, and said current monitoring circuit being latched in said set state until reset;

a reset circuit for operating said current monitoring circuit from said set state to said reset state, said reset circuit including an input stage and an output stage, said input stage being coupled to an output of said control means to permit said reset circuit to generate a reset signal in response to an enabling signal produced at said output of said control means when said current monitoring means is operated from said reset state to said set state, said output stage being coupled to a reset input of said control means to apply said reset signal to said reset input of said control means for operating said current monitoring circuit from said set state to said reset state, and override means manually operable by an operator of the vehicle to prevent said control means from responding to current flowing in the starting circuit and being operated to said set state, interrupting the starting circuit when the current flowing through the starting circuit exceeds said set point value, thereby permitting the vehicle engine to be started.

2. The system according to claim 1, wherein said override means includes portable signal transmitting means and signal receiving means coupled to said current monitoring circuit, said signal transmitting means being manually operable to generate an override signal and transmit said override signal to said signal receiving means, said signal receiving means being responsive to said override signal to prevent said current monitoring circuit from responding to an overcurrent condition in said starting circuit.

3. The system according to claim 2, wherein said signal receiving means includes a timing circuit for establishing a time interval for which said current monitoring circuit is prevented from responding to an overcurrent condition in said starting circuit.

4. The system according to claim 2, wherein said signal receiving means includes switching means operated in response to said override signal for inhibiting said current monitoring circuit.

5. The system according to claim 1, wherein the vehicle battery includes a housing, and said anti-theft battery system is mounted within said battery housing.

6. The system according to claim 1, wherein said output stage of said reset circuit includes a timer circuit for delaying the generation of said reset signal for a desired interval of time following the occurrence of said enabling signal.

7. The system according to claim 6, wherein said desired interval of time is approximately one minute.

8. The system according to claim 1, wherein said switching means comprises a solid state switching device operable between a conducting state to connect the starter motor to the battery and a non-conducting state to disconnect the starter motor from the battery.

9. An anti-theft battery system for a vehicle having a battery and a starting circuit including a starter motor which is adapted to be connected to the battery of the vehicle to be energized by current from the battery for starting an engine of the vehicle, said system comprising:

a solid state switching device connected in the starting circuit and operable to a conducting condition for connecting the starter motor to the battery and to a non-conducting condition for disconnecting the starter motor from the battery;

control means including a current monitoring circuit operable between set and reset states, said control means being coupled to said switching device for operating said switching device to said conducting condition when said current monitoring circuit is operated from said set state to said reset state, and said control means operating said switching device to said non-conducting condition when said current monitoring circuit is operated from said reset state to said set state, said current monitoring circuit being coupled to the starting circuit for monitoring current flowing in the starting circuit and being operated from said reset state to said set state when current flowing in the starting circuit exceeds a set point value, and said current monitoring circuit being latched in said set state until reset;

a reset circuit for operating said current monitoring circuit from said set state to said reset state, said reset circuit including an input stage and an output stage, said input stage being coupled to an output of said control means to permit said reset circuit to generate a reset signal in response to an enabling signal produced at said output of said control means when said current monitoring means is operated from said reset state to said set state, said output stage being coupled to a reset input of said control means to apply said reset signal to said reset input of said control means for operating said current monitoring circuit from said set state to said reset state, and said output stage of said reset circuit including a timer circuit for delaying the generation of said reset signal for a desired interval of time following the occurrence of said enabling signal, and override means manually operable by an operator of the vehicle to prevent said control means from responding to current flowing in the starting circuit and being operated to said set state, interrupting the starting circuit when the current flowing through the starting circuit exceeds said set point value, thereby permitting the vehicle engine to be started.

10. The system according to claim 9, wherein said desired interval of time is approximately one minute.

11. The system according to claim 9, wherein said override means includes a timing circuit for establishing a time interval for which said current monitoring circuit is prevented from responding to an overcurrent condition for said starting circuit.

12. The system according to claim 9, wherein said override means includes a further switching device connected to said current monitoring circuit for rendering said current monitoring circuit ineffective to respond to an overcurrent condition.

13. The system according to claim 9, wherein said switching device comprises a solid state switching device.

14. The system according to claim 9, wherein said switching device comprises an electromechanical switching device.

15. The system according to claim 9, wherein the vehicle battery includes a housing, and said anti-theft battery system is mounted within said battery housing.

* * * * *